(12) United States Patent
Thomas et al.

(10) Patent No.: US 8,086,205 B2
(45) Date of Patent: Dec. 27, 2011

(54) MULTIMODE RECEIVER WITH ACTIVE BLOCKER SUPPRESSION

(75) Inventors: Volker Thomas, Gilching (DE); Bernd Adler, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 908 days.

(21) Appl. No.: 12/114,264

(22) Filed: May 2, 2008

(65) Prior Publication Data

US 2009/0275304 A1    Nov. 5, 2009

(51) Int. Cl.
*H04B 1/00* (2006.01)
(52) U.S. Cl. ........ 455/296; 455/63.1; 455/570; 455/130; 379/406.01; 379/406.05; 370/286; 370/289
(58) Field of Classification Search ................. 455/63.1, 455/73, 78, 130, 168.1, 296, 278.1, 333, 455/251.2, 570; 379/406.01, 406.05; 370/286, 370/289
See application file for complete search history.

(56) References Cited

U.S. PATENT DOCUMENTS

| | | | | |
|---|---|---|---|---|
| 6,370,133 | B1* | 4/2002 | Kang et al. | 370/342 |
| 7,773,967 | B2* | 8/2010 | Smith | 455/295 |
| 2009/0022246 | A1* | 1/2009 | Ando | 375/319 |

OTHER PUBLICATIONS

"A Blocker Filtering Technique for Wireless Receivers", Hooman Darabi, 2007 IEEE International Solid-State Circuits Conference, ISSCC 2007/Session 4/RF Building Blocks/ 4.4, 3 pgs.
"Effective IM2 Estimation for Two-Tone and WCDMA Modulated Blockers in Zero-IF", Walid Y. Ali-Ahmad, reprinted from the Internet at: www.rfdesign.com, Apr. 2004, 5 pgs.

* cited by examiner

*Primary Examiner* — Tuan Pham
(74) *Attorney, Agent, or Firm* — Eschweiler & Associates, LLC

(57) ABSTRACT

Various embodiments of a wireless multimode receiver having an off-chip duplex filter associated with a multimode band, and a blocker cancellation circuit disposed on a semiconductor chip are described in the present disclosure.

19 Claims, 4 Drawing Sheets

MULTIMODE RECEIVER WITH ACTIVE BLOCKER SUPPRESSION

BACKGROUND OF THE INVENTION

In wireless transceiver systems there is a trend toward accommodating an ever increasing number of bands and various receiving modes (multimode) while satisfying the corresponding band and mode requirements. For example, duplex filters of EDGE/WCDMA receivers attempt to satisfy the blocker rejection requirements of both GSM-EDGE and UMTS system modes. A blocker or interferer is an unwanted signal, which tends to block the desired signals in a receiver (RX) by exceeding the linear operating range of the RX circuitry. GSM generally requires approximately 15/25 dB damping of the blockers that are greater than 20 MHz to 80 MHz above and below the reception band, while UTMS generally requires more than 50 dB damping at 20 MHz below the reception band (for the transmit (TX) leakage because of full duplex). In a multimode arrangement, two or more of these requirements may be addressed within the same receiver and/or at the same time. Accordingly, there is a need to combine these various band modes into a single receiver.

In addition, there is a growing need to decrease the costs of such receiver front-ends by reducing the number of components and/or by integrating as many components of these wireless transceivers as possible onto a single semiconductor die/chip. For example, such transmit-receive (TRX) systems are often used in wireless personal communications including cell phones, two-way radios, and PDAs.

Satisfying these multiple requirements (e.g., GSM and UMTS) simultaneously in a conventional approach, may lead to increased insertion loss in the duplex filters for at least some of the multimode bands. In one conventional approach, the GSM reference sensitivity can be impaired enough to cause the architecture to become unsuitable. For these reasons, an external (off-chip) low-noise amplifier (LNA) is often used, because they may provide better performance than the on-chip CMOS TRX, along with an interstage filter to provide additional damping of the blockers and the TX signal.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

In one embodiment, a wireless multimode receiver is disclosed, comprising an off-chip duplex filter associated with a multimode band, and a blocker cancellation circuit disposed on a semiconductor chip. The blocker cancellation circuit is coupled to the duplex filter and is configured to reject unwanted blocker signals from the receiver based on a compensation method employing feed-forward cancellation.

In another embodiment, a wireless multimode receiver is disclosed, comprising a plurality of duplex filters, each duplex filter associated with one of a plurality of multimode bands, and an antenna selectively coupled to one of the plurality of duplex filters. The receiver further comprises a plurality of blocker cancellation circuits disposed on a semiconductor die. Each blocker cancellation circuit is coupled to a corresponding one of the duplex filters and is configured to actively reject an unwanted blocker signal from the receiver employing an on-chip filtering technique.

In one embodiment of the invention, a method is disclosed for rejecting unwanted blocker signals from a receive signal comprising two different receiving modes operating within the same multimode band employing an on-chip filtering technique. The method comprises filtering the receive signal comprising first and second receive modes operating within a predetermined frequency band, amplifying on-chip the predetermined frequency band of the receive signal, and attenuating frequencies outside the predetermined frequency band. The method further comprises rejecting an unwanted blocker signal from the receive signal by receiving the filtered and amplified receive signal, receiving an in-phase quadrature signal, selecting between the first and second receive modes operating within the predetermined frequency band, and rejecting an unwanted blocker signal from the receive signal employing a filtering technique based on feed-forward cancellation.

The following description and annexed drawings set forth in detail certain illustrative aspects and implementations of the invention. These are indicative of only a few of the various ways in which the principles of the invention may be employed.

DETAILED DESCRIPTION OF THE INVENTION

Figure 1:
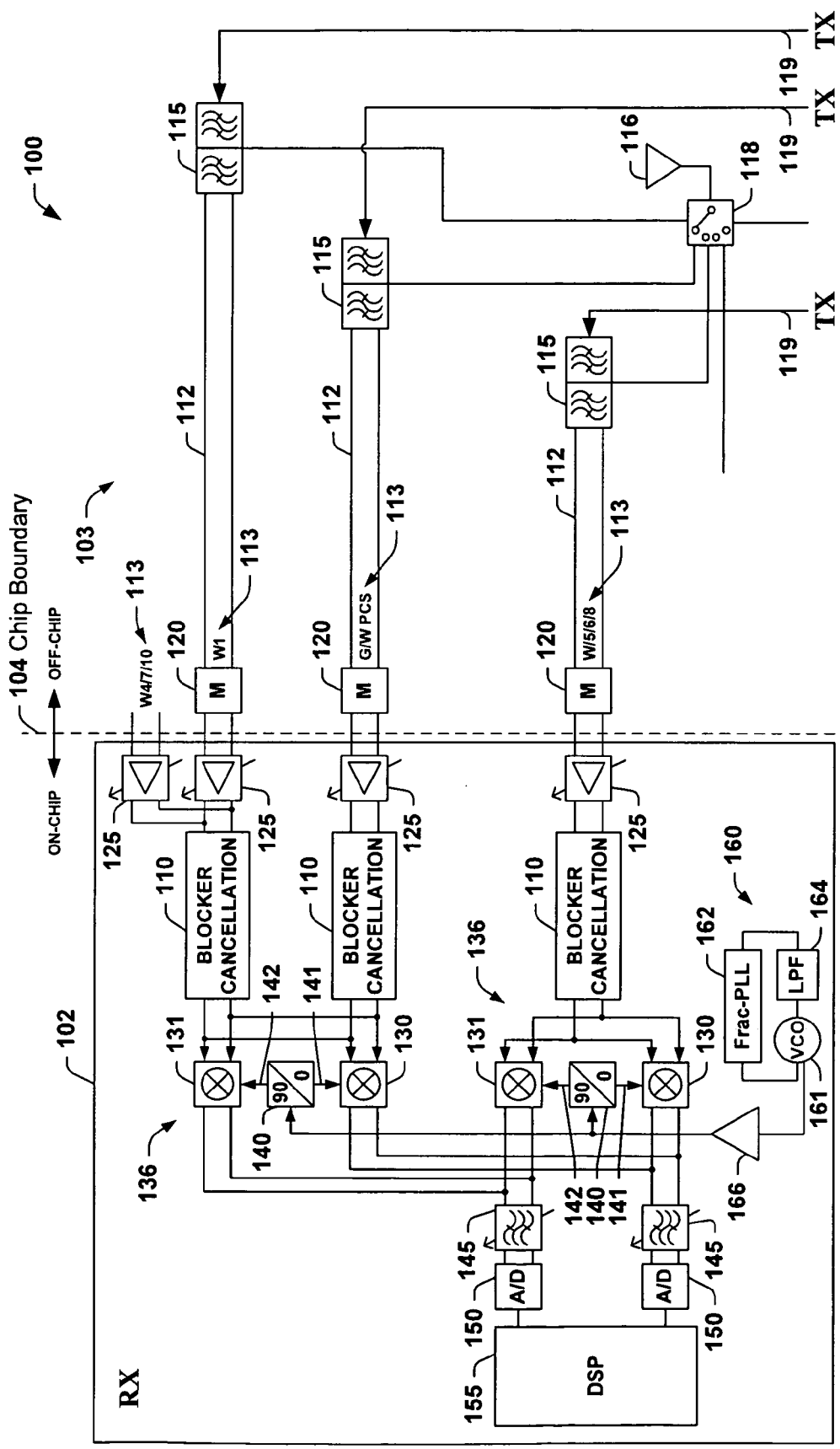
FIG. 1 is a simplified schematic diagram of a multimode receiver utilizing active blocker suppression in accordance with one embodiment of the present invention.

One or more implementations of the present invention will now be described with reference to the attached drawings, wherein like reference numerals are used to refer to like elements throughout. The invention relates to systems and methods for actively rejecting unwanted blocker signals from a wireless receiver employing an on-chip filtering technique using feed-forward cancellation of the blocker signals and for selecting between two different receiving modes operating within the same multimode band in order to combine the different receiving band modes into a single receiver.

Currently, there is a need in the wireless transceiver industry to satisfy the band requirements of two or more different receiving band modes (e.g., GSM and UMTS) operating within a single band. In the context of cell phones, or other such radio receivers, this can mean selecting on-chip filters based on the respective receive mode and/or determining whether a strong blocker signal is present within the received RX signal. This choice permits the system to activate the filtering only when a strong blocker signal is present, for example, to minimize power consumption as a result of filtering.

In addition, there is a desire to decrease the size and costs of such receivers by reducing the number of components in these front-end areas and to integrate more components onto a single semiconductor die or chip. Accordingly, the receiver of the present invention employs one or more blocker cancellation circuits configured to provide the multimode filtering requirements as well as blocker rejection on a single chip without the conventional need of off-chip amplification and/or filtering circuits. These savings in the receive path are particularly desirable as the number of supported frequency bands multiplies. Therefore, the multimode receivers of the present invention can decrease the cost, size, and component count by integrating a larger portion of the receiver on-chip. Furthermore, the number of RX bands and modes which the receiver can support may be increased as a result of the space savings with the increased level of integration.

Accordingly, a multimode receiver is provided in one embodiment of the invention that replaces the typical off-chip amplifiers and filters between the duplexer and receiver section, with on-chip active blocker suppression or cancellation circuits. Advantages over previous receiver implementations are thereby provided.

Turning now to FIG. 1, a simplified schematic diagram of a multimode receiver 100 utilizing active blocker suppression is illustrated in accordance with one embodiment of the present invention. The multimode receiver 100 comprises an on-chip receiver portion 102 and an off-chip front-end portion 103, for example, separated by a chip boundary 104. The multimode receiver 100 further comprises, in the on-chip receiver portion 102, an on-chip blocker cancellation circuit 110 using active blocker suppression to reject unwanted blocker signals from a receive RX signal 112. The blocker cancellation circuit 110 is further configured to select one of two or more different receiving modes 113 operating on the same frequency band to accept the different receiving band modes into the receiver 100.

The multimode receiver 100 also includes in one embodiment, an off-chip duplexer 115, which receives the receive RX signal 112 from an antenna 116 by way of a band selection switch 118. The duplexer 115 is also configured to supply a transmit TX signal 119 to the antenna 116 by way of the band selection switch 118. The multimode receiver 100 further comprises, in one embodiment, an off-chip matching circuit M 120 which impedance matches the on-chip receiver portion 102 to the duplexer 115 in the off-chip front-end portion 103.

While the wireless multimode receiver 100 will be described herein with specified low-noise amplifiers (LNA), mixers, demodulators, low-pass filters (LPF) and high-pass filters (HPF) as one example, it should be understood that many variations of such components and features can be made, and all such variations are contemplated as falling within the scope of the present invention.

In particular, one embodiment of the wireless multimode receiver 100, may comprise within the on-chip RX portion 102, tunable low-noise amplifiers (LNA) 125 coupled between a blocker cancellation circuit 110 and the output of the matching circuit M 120. The amplifiers 125 are operable to selectively adjust, for example, the gain, band selectivity, or pass bandwidth of the amplifier 125 according to the requirements of the supported band and/or receiving modes. The blocker cancellation circuit 110 then processes the amplified receive signal 112, which may contain both the desired signal and an unwanted blocker signal, to actively suppress or cancel out the blocker signal(s) from the receive signal 112 based on a compensation method employing feedforward cancellation, discussed in further detail infra. In addition, and as discussed above, the blocker cancellation circuit 110 also selects one of two or more different receiving modes 113 operating on the same frequency band to accept the different receiving band modes in the multimode receiver 100. In an alternate embodiment, the functions of the tunable low-noise amplifiers (LNA) 125 may be included within the blocker cancellation circuit 110, for example.

The multimode receiver 100 further comprises a quadrature demodulator 136 which includes a first mixer 130 and second mixer 131 coupled to the outputs of the blocker cancellation circuits 110 to further process the desired RX signals obtained therefrom. Quadrature demodulator 136 also includes a vector demodulator 140 coupled between the first and second mixers 130/131, which supplies an in-phase ($LO_I$, or 0°) quadrature signal 141 and an out-of-phase ($LO_Q$, or 90°) quadrature signal 142 from an oscillator circuit 160 to mixers 130/131, respectively, for demodulation of the received signal to a Zero or Low IF. In one embodiment the oscillator circuit 160 comprises a voltage controlled oscillator VCO 161, a fractional phase locked loop Frac-PLL 162, a low pass filter LPF 164, and a buffer/amplifier 166 operable to supply the local oscillator signals to the vector demodulator 140. Although quadrature and vector demodulators are discussed and illustrated herein, other types of demodulators and such circuit equivalents are also anticipated in the context of the invention.

In one embodiment, the multimode receiver 100 further comprises tunable filters 145 for filtering the demodulated RX signals, as well as analog-to-digital converters A/D 150 and a digital signal processor DSP 155 configured to further digitally process the demodulated RX signals using conventional methods.

In one embodiment if two different receiving modes operating within the same band, such as the GSM and UMTS receiving modes, are received by the multimode receiver 100, one or more blocker cancellation circuits 110 respond as follows to select the active mode. For example, blocker cancellation circuit 110 may be enabled for one or more of the different Rx modes and disabled for others. Receiver 100 may contain one of more different blocker cancellation circuits 110 which are enabled according to the operating mode. Blocker cancellation circuits 110 for each mode may be configured with different blocker rejection and bandwidth characteristics. In one example, blocker cancellation circuits 110 may be configured in GSM mode to reject high level GSM blockers, and in UMTS mode to reject the transmit (Tx) leakage signal coming from the transmit path (duplexer Tx port) attenuated by finite isolation of the duplexer.

Figure 2:
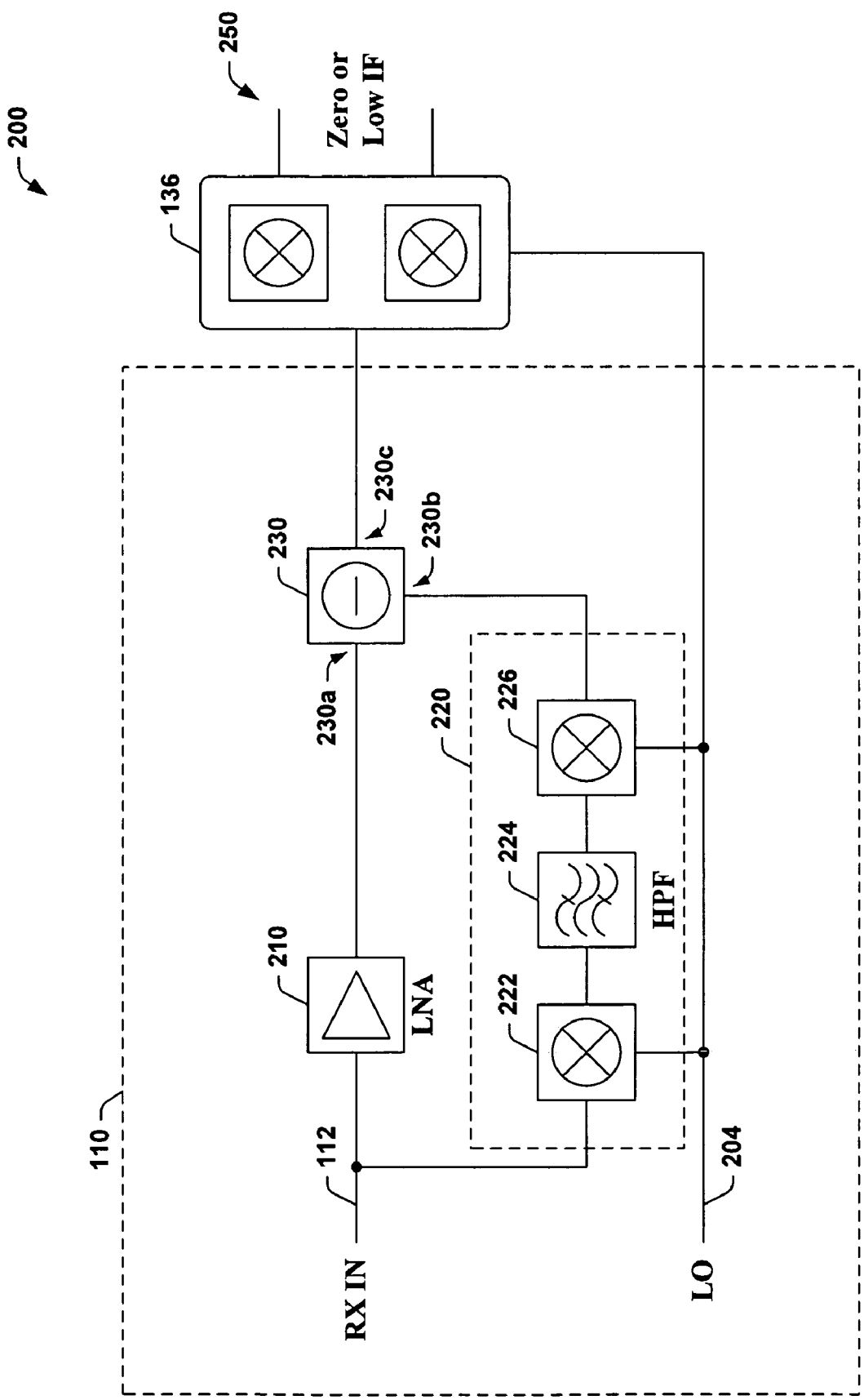
FIG. 2 is a simplified schematic diagram of a quadrature receiver section comprising a blocker cancellation circuit such as that of FIG. 1, in accordance with a first embodiment of the present invention.
Figure 3:
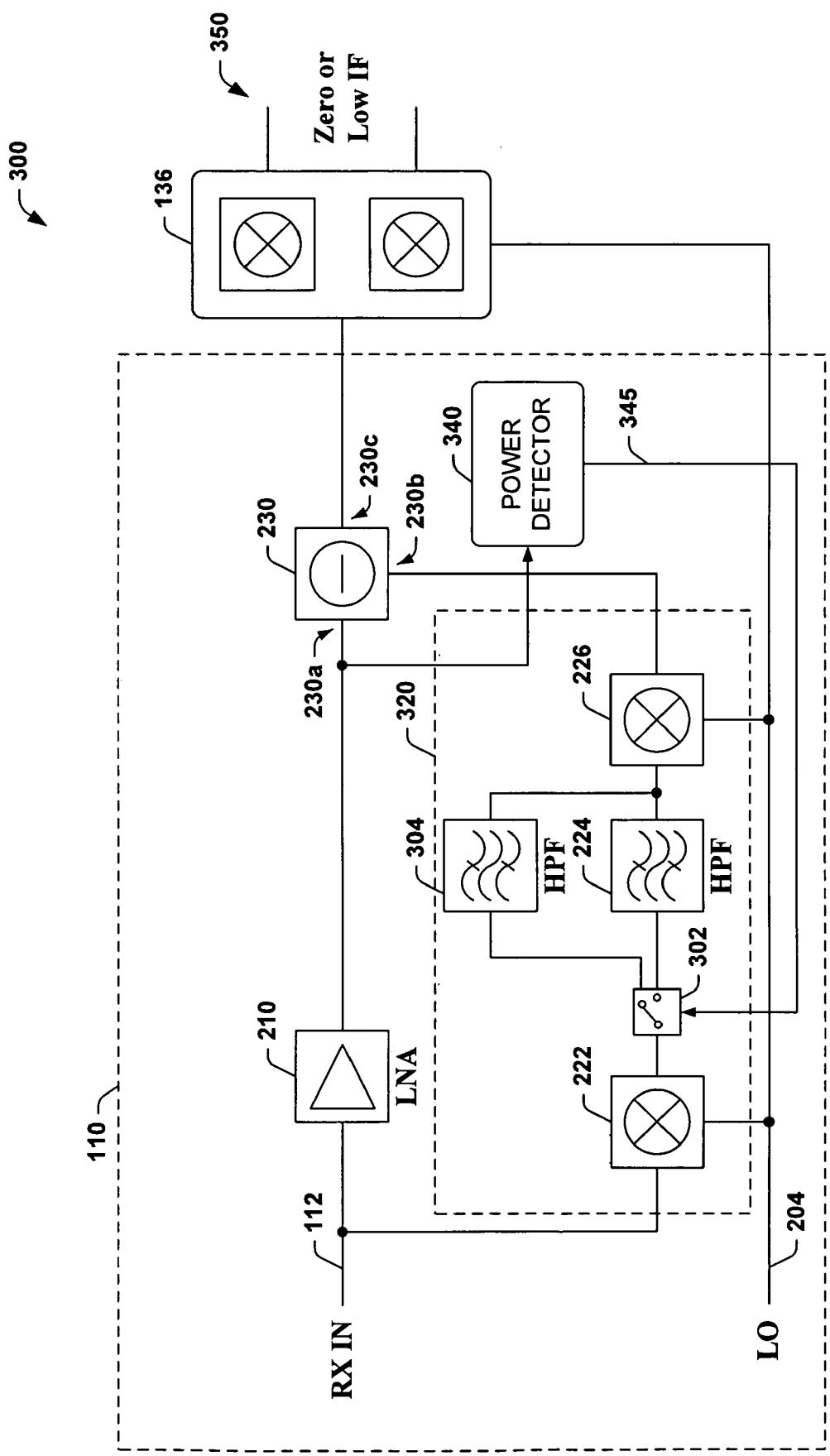
FIG. 3 is a simplified schematic diagram of a quadrature receiver section comprising a blocker cancellation circuit such as that of FIG. 1, in accordance with a second embodiment of the present invention.
Figure 4:
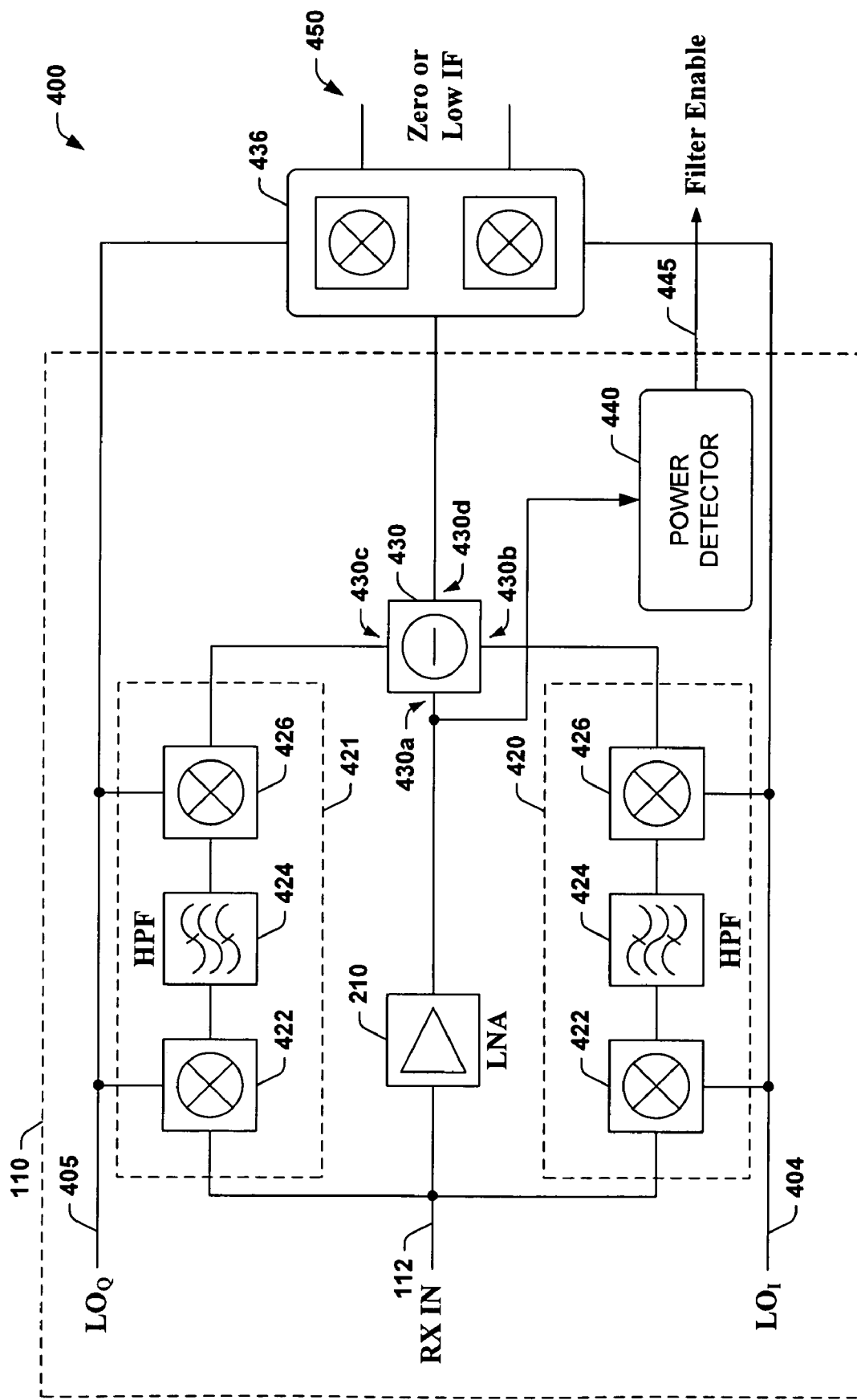
FIG. 4 is a simplified schematic diagram of a quadrature receiver section comprising a blocker cancellation circuit such as that of FIG. 1, in accordance with a third embodiment of the present invention.

FIGS. 2-4 illustrate quadrature receiver sections 200, 300 and 400 comprising first, second and third embodiments, respectively, of a blocker cancellation circuit 110 such as may be used by the multimode receiver 100 of FIG. 1, in accordance with the present invention. The quadrature receiver sections described herein generally represent a portion of the multimode receiver 100 of FIG. 1.

For example, FIG. 2 illustrates a quadrature receiver section 200 comprising a blocker cancellation circuit 110 such as may be used in the multimode receiver 100 of FIG. 1, in accordance with a first embodiment of the present invention. The blocker cancellation circuit 110 of quadrature receiver section 200 comprises a receive signal input RX IN 112, such as may be supplied from duplexer 115 of FIG. 1, and a low-noise amplifier LNA 210 connected to a first input node 230a of a summing junction 230. The receive signal input RX IN 112 is also fed to a first RX translational loop 220 connected to a second input node 230b of the summing junction 230. As indicated by the (−) sign in the center of the summing junction, summing junction 230 is used herein for subtraction of the signal at node 230b from the signal at node 230a. The blocker cancellation circuit 110 is configured to provide feed-forward cancellation of a blocker signal which may be present along with the desired signal on the receive signal 112, at an output node 230c of the summing junction 230 using a compensation method to cancel the blocker.

In one embodiment the first RX translational loop 220 of the quadrature receiver section 200 comprises a high-pass filter HPF 224 coupled between a first (or downconversion) mixer 222 and a second (or upconversion) mixer 226, employed by the compensation method to accomplish feed-forward cancellation of the unwanted blocker signal. The first RX translation loop 220 further receives a local oscillator signal LO 204 (e.g., in-phase or out-of-phase) which is mixed along with the receive signal 112 in the first and second mixers 222/226 to cancel the unwanted blocker signal. The quadrature receiver section 200 also comprises a quadrature demodulator 136 (similar to that shown in FIG. 1) which is operable to demodulate the amplified desired signal available at the output node 230c of the summing junction 230 utilizing quadrature signal LO 204, thereby providing a zero or Low IF signal 250.

Generally in the operation of the first RX translation loop 220 according to one embodiment, the desired signal accompanied by the blocker in the receive signal 112 is downconverted to a zero or low IF signal by the same LO signal 204 used in the main receive path at the first mixer 222. The desired signal is now at or near DC, and is easily removed by the high-pass filter (HPF) 224, while the blocker, for example, located at least a few tens of MHz away simply passes through. Then, the same LO signal 204 upconverts the blocker back to RF via the mixer 226, which is then subtracted back out by summing junction 230 at the output of the LNA 210. As a result of this compensation or cancellation method, a variably sharp frequency response is created, whose bandwidth and slope may be simply controlled by adjusting the HPF 224 characteristics. In one embodiment the HPF 224 corner may be adjusted to be high enough to filter the desired signal, but sufficiently low to pass the blocker.

Similarly, FIG. 3 illustrates another quadrature receiver section 300 comprising a blocker cancellation circuit 110 such as may be used in the multimode receiver 100 of FIG. 1, in accordance with a second embodiment of the present invention. The blocker cancellation circuit 110 of quadrature receiver section 300 comprises a receive signal input RX IN 112, such as may be supplied from duplexer 115 of FIG. 1, and a low-noise amplifier LNA 210 connected to a first input node 230a of a summing junction 230. The receive signal input RX IN 112 is also fed to a first RX translational loop 320 connected to a second input node 230b of the summing junction 230. The blocker cancellation circuit 110 is configured to provide feed-forward cancellation of an unwanted blocker signal or blocker which may be present along with the desired signal on the receive signal 112, at an output node 230c of the summing junction 230 using a compensation method to cancel the blocker.

In one embodiment the first RX translational loop 320 of the quadrature receiver section 300, may comprise a select switch 302 configured to select one or both of a first high-pass filter HPF 224 and a second high-pass filter HPF 304 coupled between a first (or downconversion) mixer 222 and a second (or upconversion) mixer 226, which may be employed by the compensation method to accomplish feed-forward cancellation of the unwanted blocker signal. The select switch 302 can be used to select either one or both of the HPF filters (e.g., HPF 224 or HPF 304) to selectively accommodate the band filtering requirements of a detected receiving mode, or to selectively minimize power consumption as a result of the HPF filtering when a strong blocker signal is detected in the received signal 112, for example.

The first RX translation loop 320 further receives a local oscillator signal LO 204 (e.g., in-phase or out-of-phase) which is mixed along with the receive signal 112 in the first and second mixers 222/226 to cancel the unwanted blocker signal. The quadrature receiver section 300 also comprises a quadrature demodulator 136, which is operable to demodulate the amplified desired signal available at the output node 230c of the summing junction 230 utilizing the local oscillator signal LO 204, thereby providing a zero or Low IF signal 350.

The blocker cancellation circuit 110 of the quadrature receiver section 300 of FIG. 3 further comprises a power detector 340, coupled to an output of the low noise amplifier LNA 210 (or the input 230a of the summing junction 230). In one embodiment the power detector 340 is configured to enable the select switch 302 for selection of either or both of the HPF filters (e.g., HPF 224 or HPF 304) of the first RX translation loop 320, in response to a filter enable output signal 345, for example, when a strong blocker signal is present in the received signal 112. The power detector 340 may be used to minimize power consumption as a result of such filtering, or alternately, to detect a receiving mode and selectively accommodate the band filtering requirements of a particular detected receiving mode.

FIG. 4 illustrates yet another quadrature receiver section 400 comprising a blocker cancellation circuit 110 such as may be used in the multimode receiver 100 of FIG. 1, in accordance with a third embodiment of the present invention. The blocker cancellation circuit 110 of quadrature receiver section 400 comprises a receive signal input RX IN 112, such as may be supplied from duplexer 115 of FIG. 1, and a low-noise amplifier LNA 210 connected to a first input node 430a of a summing junction 430. The receive signal input RX IN 112 is also fed to first and second RX translational loops 420 and 421, respectively, connected to second and third input nodes 430b and 430c, respectively, of the summing junction 430. The blocker cancellation circuit 110 is configured to provide feed-forward cancellation of an unwanted blocker signal or blocker which may be present along with the desired signal on the receive signal 112, at an output node 430d of the summing junction 430 using a compensation method to cancel the blocker.

The first and second RX translational loops 420 and 421, respectively, of the quadrature receiver section 400, each comprise a high-pass filter HPF 424 coupled between a first (or downconversion) mixer 422 and a second (or upconversion) mixer 426, employed by the compensation method to accomplish feed-forward cancellation of the unwanted blocker signal. The first RX translation loop 420 further receives an in-phase quadrature signal $LO_I$ 404 while the second RX translation loop 421 further receives an out-of-phase quadrature signal $LO_Q$ 405, which are mixed along with the receive signal 112 in the first and second mixers 422/426 to cancel the unwanted blocker signal(s). The quadrature receiver section 400 also comprises a quadrature demodulator 436, which is operable to demodulate the amplified desired signal available at the output node 430d of the summing junction 430 utilizing the quadrature signals $LO_I$ 404 and $LO_Q$ 405, to provide a zero or Low IF signal 450.

The blocker cancellation circuit 110 of the quadrature receiver section 400 further comprises a power detector 440 coupled to an output of the low noise amplifier LNA 210 (or the input 430a of the summing junction 430), configured to activate the filtering (e.g., HPF 424), for example, in response to a filter enable output signal 445, only when a strong blocker signal is present in the received signal 112, in order to minimize power consumption as a result of such filtering.

Generally, the operation of the quadrature receiver sections 300 and 400 of FIGS. 3 and 4, respectively, operate similar to the quadrature receiver section 200 of FIG. 2, and as such need not be described again for the sake of brevity.

Although four receiving modes are illustrated in the multimode receiver 100 of FIG. 1, any number of bands and receiving modes may be accommodated by the cancellation circuits 110 and the receiver portion 102 and/or by the multimode receiver 100, for example, and as such are contemplated within the scope of the present invention.

In one embodiment of the invention, a method is disclosed for rejecting unwanted blocker signals from a receive signal (e.g., receive signal 112) comprising two different receiving modes (e.g., GSM, UMTS, W4/7/10, W1, G/W PCS, W/5/6/8) operating within the same multimode band (e.g., GSM 850 and UMTS FDD Band 5, E-GSM 900 and UMTS Band 8, PCS 1900 and UMTS Band 2) employing an on-chip filtering technique (e.g., a compensation method employing feed-forward cancellation, such as that of FIG. 2).

In addition to or in substitution of one or more of the illustrated components, the illustrated multimode receiver and other systems of the invention may include suitable circuitry, state machines, firmware, software, logic, etc. to perform the various methods and functions illustrated and described herein, including but not limited to the methods described below.

In one embodiment the method comprises filtering the receive signal (e.g., receive signal 112) comprising first and second receive modes (e.g., GSM, UMTS) operating within a predetermined frequency band (e.g., 869 MHz to 894 MHz for GSM 850 and UMTS Band 5, 925 MHz to 960 MHz for E-GSM 900 and UMTS Band 8, 1930 MHz to 1990 MHz for PCS 1900 and UMTS Band 2), amplifying (e.g., LNA 210) on-chip (e.g., on-chip 102 vs. off-chip 103) the predetermined frequency band of the receive signal (e.g., 112), and attenuating frequencies outside the predetermined frequency band. The method further comprises rejecting an unwanted blocker signal from the receive signal (e.g., 112) by receiving the filtered and amplified receive signal (e.g., based on duplex filter 115 and LNA 125), receiving an in-phase quadrature signal (e.g., LO 204), selecting between the first and second receive modes (e.g., GSM, UMTS) operating within the predetermined frequency band, and rejecting an unwanted blocker signal from the receive signal (e.g., 112) employing a filtering technique (e.g., the compensation method of FIG. 2, using HPF 224 and mixers 222/226) based on feed-forward cancellation (e.g., at summing junction 230).

The method may further comprise further amplifying (e.g., LNA 210) the unwanted blocker signal along with the receive signal (e.g., 112), downconversion mixing (e.g., mixer 222) the receive signal (e.g., 112) with a quadrature Lo signal (e.g., LO 204), and high pass filtering (e.g., HPF 224) the mixed receive signal. The method may also comprise upconverting (e.g., mixer 226) the high-pass filtered signal to remove the desired signal from the receive signal (e.g., 112), thereby providing an upconverted blocker signal, and subtracting (e.g., via summing junction 230) the upconverted blocker signal from the amplified receive signal (e.g., 112), thereby resulting in an amplified (e.g., LNA 210) desired signal while rejecting the unwanted blocker signal.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A wireless multimode receiver, comprising:
a duplex filter associated with a multimode band; and
a blocker cancellation circuit disposed on a semiconductor chip and coupled to the duplex filter and configured to reject an unwanted blocker signal from the receiver based on a compensation method employing feed-forward cancellation,
wherein the blocker cancellation circuit comprises a low-noise amplifier (LNA) connected to a first input node of a summing junction and a first RX translational loop connected to a second input node of the summing junction, the blocker cancellation circuit configured to provide feed-forward cancellation of the unwanted blocker signal at an output node of the summing junction using the compensation method to cancel the unwanted blocker signal.

2. The receiver of claim 1, wherein the blocker cancellation circuit is further configured to select between two different receiving modes operating within the same multimode band.

3. The receiver of claim 2, wherein the two different receiving modes comprise a GSM receiving mode and a UMTS receiving mode.

4. The receiver of claim 1, wherein the first RX translational loop comprises a high-pass filter coupled between first and second mixers, the first RX translational loop used by the compensation method for the feed-forward cancellation.

5. The receiver of claim 4, wherein the first RX translational loop comprises at least two different high-pass filters selectively coupleable between the first and second mixers configured to provide two filtering levels for selecting between two different receiving modes operating within the same multimode band.

6. The receiver of claim 4, wherein the blocker cancellation circuit comprises a second RX translational loop, wherein the first RX translational loop is configured to cancel unwanted blocker signals using an in-phase RX signal ($LO_I$), and the second RX translational loop is configured to cancel unwanted blocker signals using the out-of-phase RX signal ($LO_Q$).

7. The receiver of claim 4, comprising an antenna selectively coupled to one of a plurality of duplex filters.

8. The receiver of claim 1, further comprising
a plurality of duplex filters, each duplex filter associated with one of a plurality of multimode bands; and a plurality of blocker cancellation circuits disposed on a semiconductor die, each blocker cancellation circuit coupled to a corresponding one of the duplex filters.

9. A wireless multimode receiver, comprising:
a plurality of duplex filters, each duplex filter associated with one of a plurality of multimode bands;
an antenna selectively coupled to one of the plurality of duplex filters; and
a plurality of blocker cancellation circuits disposed on a semiconductor die, each blocker cancellation circuit coupled to a corresponding one of the duplex filters and configured to actively reject an unwanted blocker signal from the receiver employing an on-chip filtering technique,
wherein the plurality of blocker cancellation circuits each comprise a low-noise amplifier (LNA) connected to a first input node of a summing junction and a first RX translational loop connected to a second input node of the summing junction, the blocker cancellation circuits configured to provide feed-forward cancellation of the unwanted blocker signal at an output node of the summing junction using the on-chip filtering technique to cancel the unwanted blocker signal.

10. The receiver of claim 9, wherein the first RX translational loop comprises a high-pass filter coupled between first and second mixers, the first RX translational loop used by the on-chip filtering technique for the feed-forward cancellation.

11. The receiver of claim 10, wherein the first RX translational loop comprises at least two different high-pass filters selectively coupleable between the first and second mixers configured to provide two filtering levels for selecting between two different receiving modes operating within the same multimode band.

12. The receiver of claim 9, wherein at least one of the blocker cancellation circuits comprises a power detector connected to an output of the low noise amplifier, configured to activate the filtering only when a strong blocker signal is present to minimize power consumption as a result of filtering.

13. The receiver of claim 9, wherein each blocker cancellation circuit comprises a second RX translational loop, wherein the first RX translational loop is configured to cancel unwanted blocker signals using an in-phase RX signal ($LO_I$), and the second RX translational loop is configured to cancel unwanted blocker signals using the out-of-phase RX signal ($LO_Q$).

14. The receiver of claim 9, wherein each blocker cancellation circuit is further configured
to receive a receive signal from the antenna by way of one of the plurality of duplex filters, the receive signal comprising first and second receive modes operating within a single frequency band,
to receive an in-phase quadrature signal,
to select between one of the first and second receive modes of the receive signal, and
to actively reject an unwanted blocker signal from the receive signal based on a filtering technique employing feed-forward cancellation.

15. The receiver of claim 14, wherein the first and second receive modes comprise a GSM receive mode and a UMTS receive mode.

16. A receiver, comprising:
filtering means disposed off-chip, operable to filter a receive signal from an antenna, the receive signal comprising first and second receive modes operating within a single frequency band, and operable to filter a transmit signal supplied to the antenna;
amplification means disposed on-chip, operable to selectively amplify a predetermined frequency band of the receive signal from the antenna and to attenuate frequencies outside the predetermined frequency band; and
blocker cancellation means disposed on-chip, operable
to receive the filtered and amplified receive signal from the antenna,
to receive an in-phase quadrature signal,
to select between the first and second receive modes operating within the same frequency band, and
to actively reject an unwanted blocker signal from the receive signal based on a filtering technique employing feed-forward cancellation,
wherein the blocker cancellation means comprises a low-noise amplifier (LNA) connected to a first input node of a summing junction and a first RX translational loop connected to a second input node of the summing junction, the blocker cancellation means configured to provide feed-forward cancellation of the unwanted blocker signal at an output node of the summing junction using the on-chip filtering technique to cancel the unwanted blocker signal.

17. The receiver of claim 16, wherein the filtering means comprises a duplex filter coupled between the antenna and the blocker cancellation means for filtering the receive signal during a receive mode, and coupled between a transmit signal means and the antenna for filtering the transmit signal during a transmit mode.

18. A method for rejecting unwanted blocker signals from a receive signal comprising two different receiving modes operating within the same multimode band employing an on-chip filtering technique, the method comprising:
filtering the receive signal comprising first and second receive modes operating within a predetermined frequency band;
amplifying on-chip the predetermined frequency band of the receive signal, and attenuating frequencies outside the predetermined frequency band; and
rejecting an unwanted blocker signal from the receive signal by:
receiving the filtered and amplified receive signal,
receiving an in-phase quadrature signal,
selecting between the first and second receive modes operating within the predetermined frequency band, and
rejecting an unwanted blocker signal from the filtered and amplified receive signal employing a filtering technique based on feed-forward cancellation,
wherein rejecting the unwanted blocker signal further comprises:
amplifying the filtered and amplified receive signal that includes the unwanted blocker signal,
downconversion mixing the receive signal with a quadrature local oscillator signal,
high pass filtering the mixed receive signal,
upconverting the high-pass filtered signal to remove the desired signal from the receive signal, thereby providing an upconverted blocker signal,
subtracting the u converted blocker signal from the amplified filtered and amplified receive signal, thereby resulting in an amplified desired signal while rejecting the unwanted blocker signal.

19. The method of claim 18, comprising quadrature demodulating the desired signal to provide a zero or low IF signal.

* * * * *

UNITED STATES PATENT AND TRADEMARK OFFICE
CERTIFICATE OF CORRECTION

| | |
|---|---|
| PATENT NO. | : 8,086,205 B2 |
| APPLICATION NO. | : 12/114264 |
| DATED | : December 27, 2011 |
| INVENTOR(S) | : Thomas et al. |

It is certified that error appears in the above-identified patent and that said Letters Patent is hereby corrected as shown below:

Column 10, claim 18, line 59; please replace "u converted" with --upconverted--

Signed and Sealed this
Fourteenth Day of February, 2012

David J. Kappos
*Director of the United States Patent and Trademark Office*